(12) United States Patent
Yamada et al.

(10) Patent No.: US 6,701,226 B2
(45) Date of Patent: Mar. 2, 2004

(54) PARKING ASSISTING DEVICE

(75) Inventors: Satoshi Yamada, Aichi-ken (JP); Kazunori Shimazaki, Aichi-ken (JP); Tomio Kimura, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/178,461

(22) Filed: Jun. 24, 2002

(65) Prior Publication Data
US 2003/0009266 A1 Jan. 9, 2003

(30) Foreign Application Priority Data
Jun. 25, 2001 (JP) ........................................ 2001-191138

(51) Int. Cl.[7] ................................................ G05D 3/00
(52) U.S. Cl. ........................................................ 701/1
(58) Field of Search ............................ 701/1; 180/204; 348/113, 118; 340/932.2

(56) References Cited

FOREIGN PATENT DOCUMENTS

| | | | |
|---|---|---|---|
| DE | 100 26 237 A1 | 12/2000 | |
| JP | 59-114139 | 7/1984 | ............. B60R/1/00 |
| WO | WO 01/14941 A1 * | 8/2000 | ............. G05D/1/02 |

\* cited by examiner

*Primary Examiner*—Yonel Beaulieu
(74) *Attorney, Agent, or Firm*—Morgan & Finnegan, LLP

(57) ABSTRACT

A controller is provided with a CPU, an EEPROM for storing data that is unique to a vehicle and which is rewritable, and a control ROM for performing parking assistance upon parking in lateral and parking in parallel, based on a minimum turning radius Rc of the data that is unique to the vehicle, which is stored in the EEPROM, and the CPU operates based on the control program stored in the control ROM. The controller 1 calculates a yaw angle of the vehicle from an angular speed of the vehicle inputted from a yaw rate sensor and information about an operation method and operation timing in each step during the drive for parking in lateral and parking in parallel is outputted to a speaker through calculating a turning angle of the vehicle, thereby appropriately assisting a driver with parking.

6 Claims, 3 Drawing Sheets

PARKING ASSISTING DEVICE

BACKGROUND OF THE INVENTION

1. Field of the Invention

The present invention relates to a parking assisting device, and more particularly, to a device for guiding a driver a driving operation upon parking through sound.

2. Description of the Related Art

Conventionally, there has been proposed a device for showing a rear view of a vehicle on a monitor if a driver becomes unable to see a target place due to a blind spot of the vehicle when the vehicle is moving backward. For example, JP 02-036417B discloses a rear watch monitor device for a vehicle constructing of: a television camera for taking the rear view of a vehicle; a monitor television for showing a video taken by the television camera; a sensor for outputting an information signal relating to a tire steering angle; and a circuit for generating a marker signal in response to an information signal from the sensor and superimposingly displaying a marker (indicator) on a television screen. In this device, steering angle data of tires and marker position data along a backward movement of a vehicle corresponding to the steering angle are accumulated in a ROM, and an estimated backward movement track of the vehicle corresponding to the steering angle at that time is superimposed on the video image taken by the television camera to be displayed on the television screen as a line of the marker.

According to such a device, an estimated backward movement track of a vehicle corresponding to a steering angle is displayed on the screen of the monitor television together with a rear view such as a state of a road when the vehicle is moving backward. Therefore, a driver can operate a steering wheel to move the vehicle backward while keeping an eye on the television screen without turning backward.

However, for example, when a vehicle is parked in lateral or parallel, with the conventional rear watch monitor device, it is difficult for the driver to determine timing and a degree of a steering angle for a driving operation for the parking by merely looking at the rear view of the vehicle and an estimated backward movement track of the vehicle on the television screen, resulting in a problem in that the parking can not be sufficiently assisted.

Also, with the conventional rear watch monitor device, the driver needs to perform a driving operation while watching the television screen. Thus, there also arises a problem in that the driver must pay attention to the safety around the vehicle to cause a large burden on the driver. Further, it is desired that the device for assisting parking may easily be applied to various vehicles without depending on the types of the vehicles.

SUMMARY OF THE INVENTION

The present invention has been made in view of solving the above problems, and it is an object of the present invention to provide a parking assisting device capable of being applied to various types of vehicles and of accurately guiding a driver a driving operation upon parking without imposing a large burden on a driver.

In order to solve the above-mentioned object, a parking assisting device according to the present invention includes: a yaw angle detecting means for detecting a yaw angle of a vehicle; a reference setting means for setting a reference position of the yaw angle; a storing means for storing data that is unique to the vehicle and which is rewritable; a controller for specifying a position of the vehicle based on the yaw angle and the data that is unique to the vehicle; and a guiding means for providing parking assistance information to a driver based on the position of the vehicle specified by the controller.

It is preferable that the parking assistance information includes information in which: the vehicle is moved forward or backward in a state where a fixed steering angle is maintained; thereafter, the vehicle is steered in an opposite direction in a state where the vehicle is stopped and then is moved backward in the state where the fixed steering angle is maintained; and finally the vehicle is parked in a target parking space.

The fixed steering angle is a maximum rudder angle, and the data unique to the vehicle may include a value of a minimum turning radius.

Initial writing or rewriting of the storing means may be performed via a recording medium or a network.

DESCRIPTION OF THE PREFERRED EMBODIMENT

An embodiment of the present invention will be hereinafter described based on the accompanying drawings.

Figure 1:
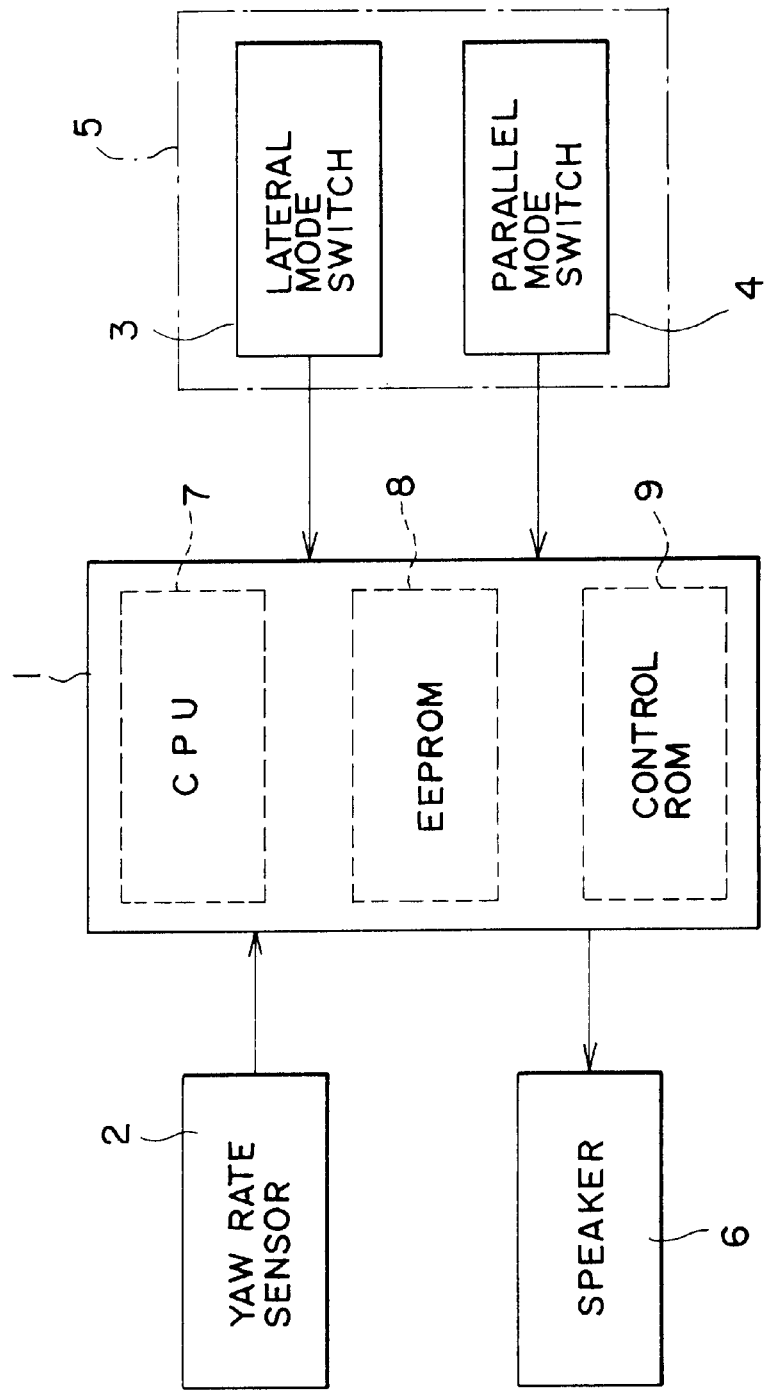
FIG. 1 is a block diagram showing a structure of a parking assisting device according to an embodiment of the present invention.

FIG. 1 shows a structure of a parking assisting device in accordance with an embodiment of the present invention. Connected to a controller 1 are a yaw rate sensor 2 for detecting an angular speed in a direction of a yaw angle of a vehicle and a switch module 5, constituted by a lateral mode switch 3 for informing the controller that a vehicle performs parking in lateral and a parallel mode switch 4 for informing the controller 1 that the vehicle performs parking in parallel. Further, a speaker 6 for directing a driver information on a driving operation is connected with the controller 1.

The controller 1 is provided with a CPU 7, an EEPROM (electrically erasable programmable ROM) 8 for storing data that is unique to the vehicle and which is rewritable, and a control ROM 9 that stores control program.

Data that is unique to the vehicle, namely, a target angle that is necessary for a parking operation using a minimum turning radius Rc which will be described below, is stored in the EEPROM 8. Initial writing or rewriting of data relating to this minimum turning radius Rc to the EEPROM 8 is performed through a recording medium such as a CD or a DVD used in a navigation system. Accordingly, initial writing or rewriting work to the EEPROM 8 can be easily performed with reading from the recording medium anytime needed. Therefore, there is no need to prepare a parking assisting device dedicated for a target vehicle for per vehicle, and one type of parking assisting device can be applied to various types of vehicles. Further, the setting and changing of the data that is unique to the vehicle can be easily performed not only in a factory but also in a store or at home, and the data can be reset anytime.

Note that, as a setting method of the vehicle data to the EEPROM 8, in a case where the Web on the Internet can be viewed with the navigation system, setting may be performed through downloading necessary data from a site for the parking assisting device using this network. Further, a setting and reading operation of the data that is unique to the vehicle may be performed by using an existing switch on the navigation system or an exclusive setting switch consisting of a button, a knob or the like. Furthermore, it may also be possible to prepare in the EEPROM 8 a region for adjusting a habit of a user or slight variation in the same type of vehicles and to allow the above-mentioned existing switch or the exclusive switch to serve also as switches for a fine adjustment of the existing data that is unique to the vehicle in the EEPROM 8. According to such an embodiment, a more detailed setting operation that can cope with the habit of the user or the slight variation in the same type of vehicles can be performed. The exclusive setting switch may be provided so as to constitute the switch module 5 together with the other switches, or may be provided individually, separated from the switch module 5. Further, when a digital rotary switch is used as the setting switch, no limitation is imposed on a range of the value to be set, whereby both a wide range and a small range can be set.

On the other hand, a control program for performing parking assistance upon parking in lateral and parking in parallel of a vehicle based on a target angle, which is necessary for a parking operation and is stored in the EEPROM 8, is stored in the control ROM 9. The CPU 7 operates based on the control program stored in the control ROM 9. The controller 1 calculates a yaw angle of a vehicle from an angular speed of the vehicle inputted from the yaw rate sensor 2, calculates a turning angle of the vehicle from a predetermined reference and outputs information on an operation method and operation timing in each step during the parking operation to the speaker 6.

Here, what kind of track the parking assisting device of this embodiment makes a vehicle draw to assist parking will be described.

Figure 2:
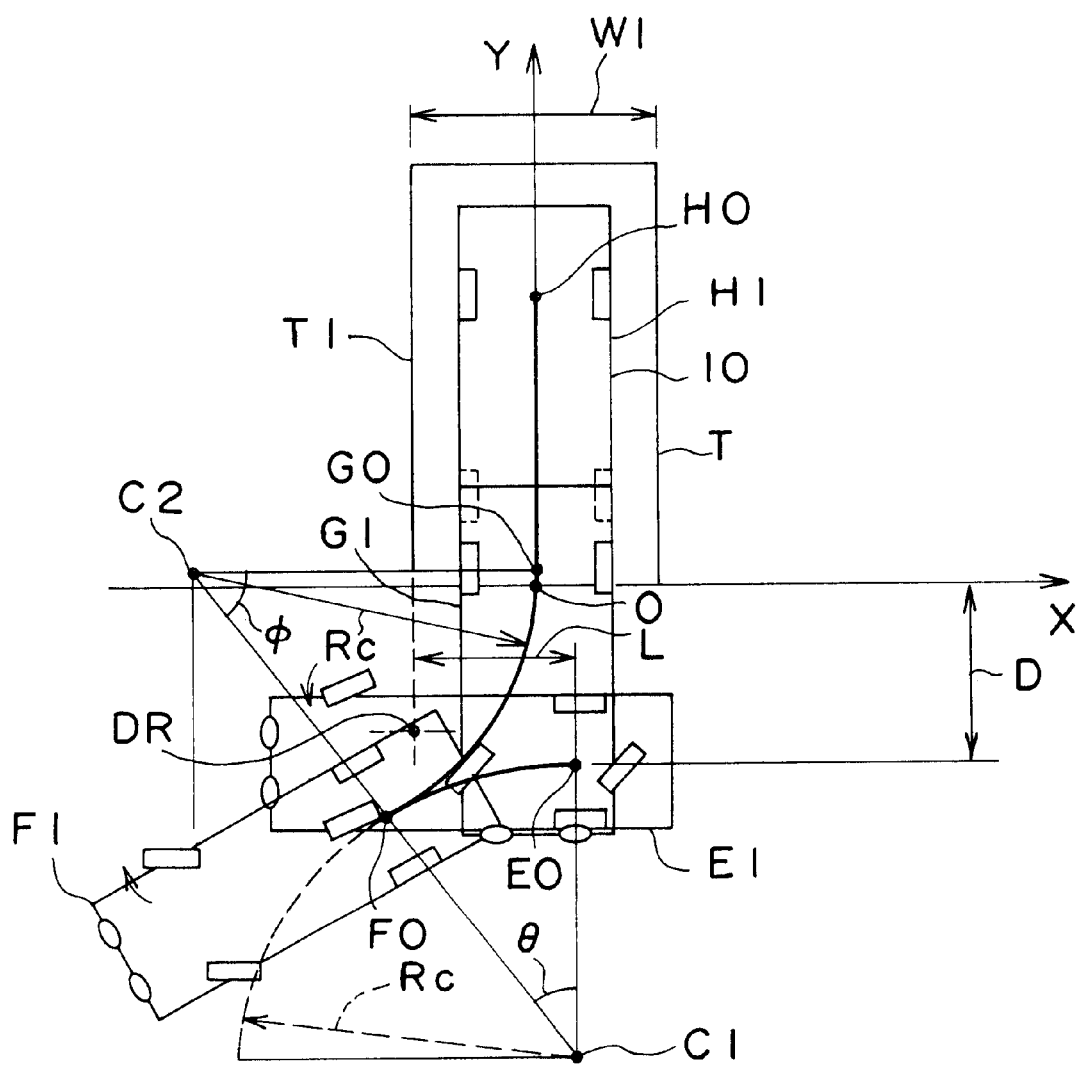
FIG. 2 is a diagram step-by-step and schematically showing a position of a vehicle when being parked in lateral according to the embodiment of the present invention.

First, a case in which parking in lateral is performed will be described with reference to FIG. 2. In parking in lateral, a vehicle reversed into the perpendicular parking space.

A central point of an entrance in a parking space T where a vehicle 10 is to be parked is assumed to be an origin O, a Y axis is taken in a direction perpendicular to a road, which is a backward direction of the vehicle 10 in the parking space T, and an X axis is taken in lateral with the road, that is, perpendicular to the Y axis. In addition, a width of a parking frame in the parking space T is assumed to be W1. The parking assisting device is assumed to assist a driver so that the vehicle 10 is appropriately parked in a vehicle position H1 where a rear axle center HO is in the center of a width direction of the parking space T, and is lateral with a length direction of the parking space T.

First, as an initial stopping position, it is assumed that the vehicle 10 is stopped in a vehicle position E1, which is perpendicular to the parking space T and where a rear axle center EO of the vehicle 10 is at a distance of D from the entrance of the parking space T and a side portion T1 of the parking space T and a position DR of the driver of the vehicle 10 coincide with each other.

Next, it is assumed that the vehicle 10 in a vehicle position E1 advances to a turning angle 6 while turning at the minimum turning radius Rc with a steering angle of a steering wheel at the maximum leftward; when the vehicle 10 reaches a vehicle position F1, moves backward by a turning angle $\phi$ while turning at the minimum turning radius Rc with the steering angle of the steering wheel at the maximum rightward; and further moves backward with the steering wheel returned to a straight forward state in a vehicle position G1 where the vehicle 10 is in parallel with the parking space T to be appropriately parked in a vehicle position H1 in the parking space T.

In addition, rear axle centers in the vehicle positions E1, F1 and G1 are assumed to be EO, FO and GO, respectively.

Here, when a distance in an x axis direction between the position DR of the driver and the rear axle center EO in the vehicle position E1 is assumed to be L, coordinates (C1x, C1y) of a turning center C1 at a time when the vehicle 10 turns from the vehicle position E1 to the vehicle position F1 are represented by the following expressions:

$$C1x = L - W1/2$$

$$C1y = -(D + Rc)$$

Coordinates (C2x, C2y) of a turning center C2 at a time when the vehicle 10 turns from the vehicle position F1 to the vehicle position G1 are represented by the following expressions:

$$C2x = -(Rc + Rc) \cdot \sin \theta + C1x = -2Rc \cdot \sin \theta + L - W1/2$$

$$C2y = (Rc + Rc) \cdot \cos \theta + C1y = 2Rc \cdot \cos \theta - (D + Rc)$$

Here, the X coordinate C2x is also represented by the following expression:

$$C2x = -Rc$$

sin θ is represented by the following expression from two relational expressions of the X coordinate C2x.

$$\sin \theta = (Rc + L - W1/2)/2Rc$$

The value of θ can be calculated using the known minimum turning radius Rc, the distance L, and the width W1. The controller 1 stores the value of θ as a set value θ.

Moreover, the turning angle $\phi$ at which the vehicle 10 turns from the vehicle position F1 to the vehicle position G1 is represented by the following expression:

$$\phi = \pi/2 - \theta$$

Next, operations of the parking assisting device in accordance with this embodiment at the time of parking in lateral will be described.

First, when the driver stops the vehicle 10 in the vehicle position E1 and actuates the lateral mode switch 3 at this point, the controller 1 sets the vehicle position E1 as a position where a yaw angle of the vehicle is zero degrees and simultaneously activates a program for parking in lateral. Next, the driver steers the steering wheel to the maximum leftward to bring it to a fully turned state and advances the vehicle 10 in that state.

The controller 1 calculates a yaw angle of the vehicle from an angular speed of the vehicle 10 inputted from the yaw rate sensor 2 and compares this yaw angle with the set value θ. As the vehicle 10 approaches the vehicle position F1 from the vehicle position E1, the controller 1 informs the driver of approach information notifying that the vehicle has approached the vehicle position F1 and arrival information notifying that the vehicle has reached the vehicle position F1 based on the difference between the yaw angle and the set value θ via the speaker 6.

For example, an intermittent sound is emitted from the speaker 6 as the approach information, and the cycle of this intermittent sound and blinking becomes shorter as the difference between the yaw angle and the set value θ decreases. When the difference between the yaw angle and the set value θ is eliminated, continuous sound is emitted from the speaker 6 as the arrival information.

The driver stops the vehicle 10 in the vehicle position F1 in accordance with the arrival information. Next, the driver steers the steering wheel to the maximum rightward to bring it to a fully turned state and moves the vehicle 10 backward in that state. As the yaw angle of the vehicle 10 approaches 90 degrees, the controller 1 informs the driver of the approach information, notifying the that the vehicle 10 has approached the vehicle position G1 that is lateral with the parking space T and the arrival information notifying that the vehicle 10 has reached the vehicle position G1 via the speaker 6. The driver stops the vehicle 10 in the vehicle position G1 in accordance with the arrival information, thereafter moves the vehicle 10 backward with the steering wheel returned to a straight forward state and accommodates the vehicle 10 in the parking space T, whereby the parking is completed.

Figure 3:
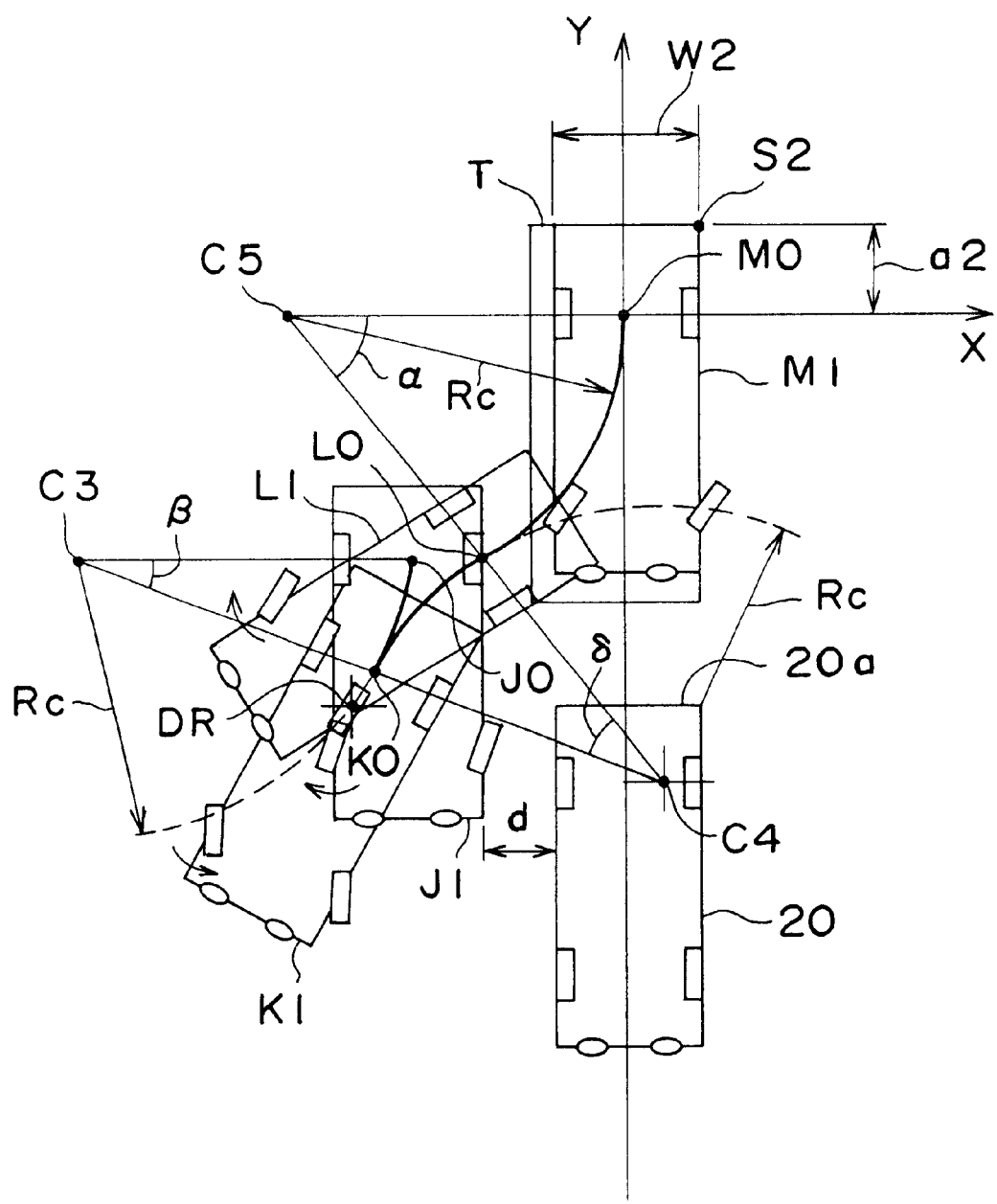
FIG. 3 is a diagram step-by-step and schematically showing a position of a vehicle when being parked in parallel according to the embodiment of the present invention.

Next, a case in which parking in parallel is performed will be described with reference to FIG. 3.

It is assumed that the vehicle 10 is parked in the parking space T so that a rear left end of the vehicle 10 coincides with a corner S2 in the back of the parking space T. A rear axle center MO of the vehicle 10 in a vehicle position M1 in this state is assumed to be an origin, and a Y axis is taken in a direction lateral with a road, which is the backward direction of the vehicle 10 and an X axis is taken perpendicularly to the Y axis. In addition, coordinates at the corner in the back of the parking space T are assumed to be S2(W2/2, a2). Here, a2 and W2 denote a rear overhang and a vehicle width of the vehicle 10, respectively.

It is assumed that the vehicle 10 in a vehicle position J1 advances while turning at the minimum turning radius Rc with the steering angle of the steering wheel at the maximum rightward. When the vehicle 10 reaches a vehicle position K1, moves backward while turning at the minimum turning radius Rc with the steering angle at the maximum leftward; and, when the vehicle reaches a vehicle position L1, moves backward while turning at the minimum turning radius Rc with the steering angle at the maximum rightward to appropriately park the vehicle 10 in the vehicle position M1 within the parking space T.

First, it is assumed that parking in parallel is started with a vehicle 20 parked in a predetermined position in front of the parking space T as a mark and a state in which the vehicle 10 is parked in the vehicle position J1 as an initial stopping position.

The vehicle position J1 is assumed to be a position where a Y coordinate of a position DR of a driver of the vehicle 10 coincides with the Y coordinate of a rear end 20a of the parked vehicle 20, which is a position in lateral with the parking space T, and a position where the vehicle 10 and the vehicle 20 are spaced apart from each other by a predetermined distance d. Therefore, coordinates (JOx, JOy) of a rear axle center JO of the vehicle position J1 are unconditionally defined from the relation between the coordinates of the rear end 20a of the vehicle 20, the position DR of the driver, and the rear axle center JO and the vehicle distance d.

The vehicle 10 in the vehicle position J1 advances to the vehicle position K1 while turning at the minimum turning radius Rc with the steering angle of the steering wheel at the maximum rightward. In this case, a turning center is assumed to be C3 and a turning angle is assumed to be β. In addition, the vehicle 10 in the vehicle position K1 moves backward to the vehicle position L1 while turning at the minimum turning radius Rc with the steering angle at the maximum leftward. In this case, a turning center is assumed to be C4 and a turning angle is assumed to be δ. Moreover, the steering wheel is turned in the opposite direction in the vehicle position L1 and the vehicle 10 moves backward to the vehicle position M1 while turning at the minimum turning radius Rc with the steering angle at the maximum rightward. In this case, a turning center is assumed to be C5 and a turning angle is assumed to be α.

In addition, rear axle centers in the vehicle positions K1 and L1 are assumed to be KO and LO, respectively.

The turning angles α, β and δ have the following relationship:

$$\delta = \alpha - \beta$$

Coordinates (C5x, C5y) of the turning center C5 are represented by the following expressions:

$$C5x = -Rc$$

$$C5y = 0$$

Coordinates (C4x, C4y) of the turning center C4 are represented by the following expressions:

$$C4x = C5x + (Rc+Rc) \cdot \cos\alpha = -Rc + 2Rc \cdot \cos\alpha$$

$$C4y = C5y - (Rc+Rc) \cdot \sin\alpha = -2Rc \cdot \sin\alpha$$

Coordinates (C3x, C3y) of the turning center C3 are represented by the following expressions:

$$C3x = C4x - (Rc+Rc) \cdot \cos\beta = -Rc + 2Rc \cdot \cos\alpha - 2Rc \cdot \cos\beta$$

$$C3y = C4y + (Rc+Rc) \cdot \sin\beta = -2Rc \cdot \sin\alpha + 2Rc \cdot \sin\beta$$

In addition, coordinates (JOx, JOy) of the rear axle center JO of the vehicle position J1 are represented by the following expressions:

$$JOx = -Rc \cdot (1-\cos\alpha) - Rc \cdot (1-\cos\alpha - 1 + \cos\beta) + Rc \cdot (1-\cos\beta) = 2Rc \cdot (\cos\alpha - \cos\beta) \quad (1)$$

$$JOy = -Rc \cdot \sin\alpha - Rc \cdot (\sin\alpha - \sin\beta) + Rc \cdot \sin\beta = 2Rc \cdot (\sin\beta - \sin\alpha) \quad (2)$$

Here, when the above expressions (1) and (2) are transformed using a formula of the trigonometric functions, the following expressions are obtained:

$$\tan(\alpha/2 + \beta/2) = JOx/JOy$$

$$\sin^2(\alpha/2 - \beta/2) = (JOx^2 + JOy^2)/(16Rc^2)$$

α and β can be calculated using the coordinates (JOx, JOy) of the known rear axle center JO and these values are stored in the controller 1 as set values α and β.

The coordinates (JOx, JOy) of the rear axle center JO use, for example, the values of JOx=2.3 m and JOy=4.5 m as values for allowing to park the vehicle 10 behind the vehicle 20 by a natural operation. It is desirable to set the values of the coordinates JOx and Joy of the rear axle center JO according to grade, steering property and the like of the vehicle 10.

Next, an operation of the parking assisting device in accordance with this embodiment at the time of parking in parallel will be described.

First, the driver stops the vehicle 10 in the vehicle position J1 so that a Y coordinate of the position DR of the driver coincides with a Y coordinate of the rear end 20a of the parked vehicle 20 and the vehicle 10 is spaced apart from the vehicle 20 by the vehicle distance d. When the parallel mode switch 4 is actuated at this point, the controller 1 sets the vehicle position J1 as a position where a yaw angle of the vehicle is zero degree and simultaneously activates a program for parking in parallel. Next, the driver steers the steering wheel of the vehicle 10 to the maximum rightward to bring it to a fully turned state and advances the vehicle 10 in that state. The controller 1 calculates a yaw angle of the vehicle from an angular speed of the vehicle 10 inputted from the yaw rate sensor 2 and compares the yaw angle with the value of the set value β. As the vehicle 10 approaches the vehicle position K1 from the vehicle position J1, the controller 1 informs the driver of approach information notifying that the vehicle has approached the vehicle position K1 and arrival information notifying that the vehicle has reached the vehicle position K1, based on the difference between the yaw angle and the set value β via the speaker 6 in the same manner as that for the parking in lateral.

The driver stops the vehicle 10 in the vehicle position K1 in accordance with the arrival information. Next, the driver steers the steering wheel to the maximum leftward to bring it to a fully turned state and moves the vehicle 10 backward in that state. The controller 1 compares the yaw angle of the vehicle and a value of the set value α(=β+δ). As the vehicle 10 approaches the vehicle position L1 from the vehicle position K1, that is, the yaw angle of the vehicle approaches the value of the set value α, the controller 1 informs the driver of approach information notifying that the vehicle has approached the vehicle position L1 and arrival information notifying that the vehicle has reached the vehicle position L1 based on the difference between the yaw angle and the set value α via the speaker 6 in the same manner as that for the parking in lateral.

The driver stops the vehicle 10 in the vehicle position L1 in accordance with the arrival information. Next, the driver turns the steering wheel in the opposite direction in the vehicle position L1, steers it to the maximum rightward to bring it to a fully turned state and moves the vehicle 10 backward in that state. As the yaw angle of the vehicle 10 approaches zero degree, the controller 1 informs the driver of the approach information notifying that the vehicle has approached the vehicle position M1 within the parking space T and arrival information notifying that the vehicle has reached the vehicle position M1 via the speaker 6. In this manner, the driver stops the vehicle 10 in the vehicle position M1, whereby the parking is completed.

As described above, in the parking assisting device according to this embodiment, there are not required a camera and a monitor, and it is possible to accurately guide the driver the driving operation upon parking without imposing a large burden on the driver and to appropriately assist the parking. Further, while such an excellent parking assistance is realized using the data that is unique to the vehicle, the device itself can be applied to various vehicles without depending on the type of vehicle.

Note that, in this embodiment, the yaw rate sensor is used to detect the yaw angle. However, the means for detecting the yaw angle may also include a method using a position gyroscope, a method for detecting the yaw angle from a rotation difference obtained through rotation sensors mounted to left and right wheels of the vehicle, respectively, and a method using a terrestrial magnetic sensor or a GPS system.

The means for informing the driver of the approach information and the arrival information is not limited to the speaker 6 and an LED, a buzzer, an LCD or a lamp may be applied, and characters or marks may also be displayed on the display. Further, the speaker 6 may also emit sound as words. Moreover, the approach information and the arrival information may change volume and timbre of the sound emitted from the speaker 6, or may emit sound having different contents.

What is claimed is:

1. A parking assisting device comprising:

a yaw angle detecting means for detecting a yaw angle of a vehicle;

a reference setting means for setting a reference position of the yaw angle;

a storing means for storing data that is unique to the vehicle and which is rewritable;

a controller for specifying a position of the vehicle based on the yaw angle and the data that is unique to the vehicle; and a guiding means for providing parking assistance information to a driver based on the position of the vehicle specified by the controller.

2. A parking assisting device according to claim 1, wherein the parking assistance information includes information in which: the vehicle is moved forward or backward in a state where a fixed steering angle is maintained; thereafter, the vehicle is steered in an opposite direction in a state where the vehicle is stopped and then is moved backward in the state where the fixed steering angle is maintained; and finally the vehicle is parked in a target parking space.

3. A parking assisting device according to claim 2, wherein the fixed steering angle is a maximum rudder angle, and the data that is unique to the vehicle includes a value of a minimum turning radius or a value relating thereto.

4. A parking assisting device according to claim 1, wherein initial writing or rewriting of the storing means is performed via a recording medium.

5. A parking assisting device according to claim 1, wherein initial writing or rewriting of the storing means is performed via a network.

6. A parking assisting device according to claim 1, wherein:

the controller is provided with a control ROM in which a control program for performing parking assistance is stored; and the storing means is constituted by an EEPROM that is separate from the control ROM.

* * * * *

UNITED STATES PATENT AND TRADEMARK OFFICE
CERTIFICATE OF CORRECTION

PATENT NO. : 6,701,226 B2
DATED : March 2, 2004
INVENTOR(S) : Satoshi Yamada et al.

It is certified that error appears in the above-identified patent and that said Letters Patent is hereby corrected as shown below:

Column 3,
Line 65, please delete "6" and insert therefore -- $\theta$ --

Column 4,
Line 12, please delete "whenadistance in anx" and insert therefore -- when a distance in an X --

Column 5,
Line 4, please delete "6" and insert therfore -- $\theta$ --

Column 6,
Line 60, please delete "Joy" and insert therefore -- JOy --

Signed and Sealed this

Thirteenth Day of July, 2004

JON W. DUDAS
*Acting Director of the United States Patent and Trademark Office*